(12) United States Patent
Ikuta et al.

(10) Patent No.: US 9,783,195 B2
(45) Date of Patent: Oct. 10, 2017

(54) CONTROL APPARATUS FOR VEHICLE

(71) Applicant: TOYOTA JIDOSHA KABUSHIKI KAISHA, Toyota-shi, Aichi-ken (JP)

(72) Inventors: Tetsuya Ikuta, Toyota (JP); Yasutaka Matsunaga, Toyota (JP); Sho Komai, Toyota (JP); Yuma Hoshikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 71 days.

(21) Appl. No.: 15/008,052

(22) Filed: Jan. 27, 2016

(65) Prior Publication Data

US 2016/0221574 A1 Aug. 4, 2016

(30) Foreign Application Priority Data

Feb. 3, 2015 (JP) ................................. 2015-019477

(51) Int. Cl.
*B60W 30/09* (2012.01)
*B60W 30/08* (2012.01)
(Continued)

(52) U.S. Cl.
CPC ............ *B60W 30/09* (2013.01); *B60W 30/08* (2013.01); *B60B 39/00* (2013.01); *B60T 8/1763* (2013.01);
(Continued)

(58) Field of Classification Search
CPC .......... G06F 17/10; G06F 7/00; B60W 30/09; B60W 10/02; B60W 10/18; B60W 30/14;
(Continued)

(56) References Cited

U.S. PATENT DOCUMENTS 7,124,027 B1 * 10/2006 Ernst, Jr. ............... B60W 30/09
340/435
8,954,249 B2 * 2/2015 Nakatsu .................. B60L 3/102
701/69

(Continued)

FOREIGN PATENT DOCUMENTS

JP 2002-114118 A 4/2002
JP 2007-249539 A 9/2007
(Continued)

*Primary Examiner* — Behrang Badii
(74) *Attorney, Agent, or Firm* — Oliff PLC

(57) ABSTRACT

A control apparatus for a vehicle includes a controller configured to (i) calculate, based on a distance and a relative speed between a host vehicle and a forward obstacle, a collision prediction time of a collision between the forward obstacle and the host vehicle; (ii) execute a predetermined control when the collision prediction time is less than or equal to a predetermined threshold, the predetermined control reducing a probability of the collision between the forward obstacle and the host vehicle, and (iii) decrease the predetermined threshold, when an accelerator pedal releasing operation is performed under a situation where the forward obstacle exists, depending on a first distance between the host vehicle and the forward obstacle at a time at which the accelerator pedal releasing operation is performed.

3 Claims, 8 Drawing Sheets

1

(51) Int. Cl.
*B60W 50/14* (2012.01)
*G06F 17/10* (2006.01)
*B60W 10/02* (2006.01)
*G06F 7/00* (2006.01)
*B60B 39/00* (2006.01)
*B60W 10/18* (2012.01)
*B60T 8/1763* (2006.01)

(52) U.S. Cl.
CPC ............ *B60W 10/02* (2013.01); *B60W 10/18* (2013.01); *B60W 2050/143* (2013.01); *B60W 2540/10* (2013.01); *B60W 2550/10* (2013.01); *B60W 2550/30* (2013.01); *B60W 2550/302* (2013.01); *B60W 2550/308* (2013.01); *G06F 7/00* (2013.01); *G06F 17/10* (2013.01)

(58) Field of Classification Search
CPC ........... B60W 20/00; B60W 2050/143; B60W 2540/10; B60W 2550/10; G01S 13/931; B60B 39/00; B60T 8/1763; B60T 7/22; B60T 13/68; B60T 13/14; B60L 3/102; B60L 7/14; G08G 1/00; B60K 31/00; B60K 26/00; B60K 26/02
See application file for complete search history.

(56) References Cited

U.S. PATENT DOCUMENTS

2009/0319148 A1  12/2009  Kubo et al.
2014/0095038 A1* 4/2014  Breu .................... B60W 10/02
                                              701/67

FOREIGN PATENT DOCUMENTS

| JP | 4712830 B2 | 6/2011 |
| JP | 2012-003710 A | 1/2012 |
| JP | 2013-014225 A | 1/2013 |

* cited by examiner

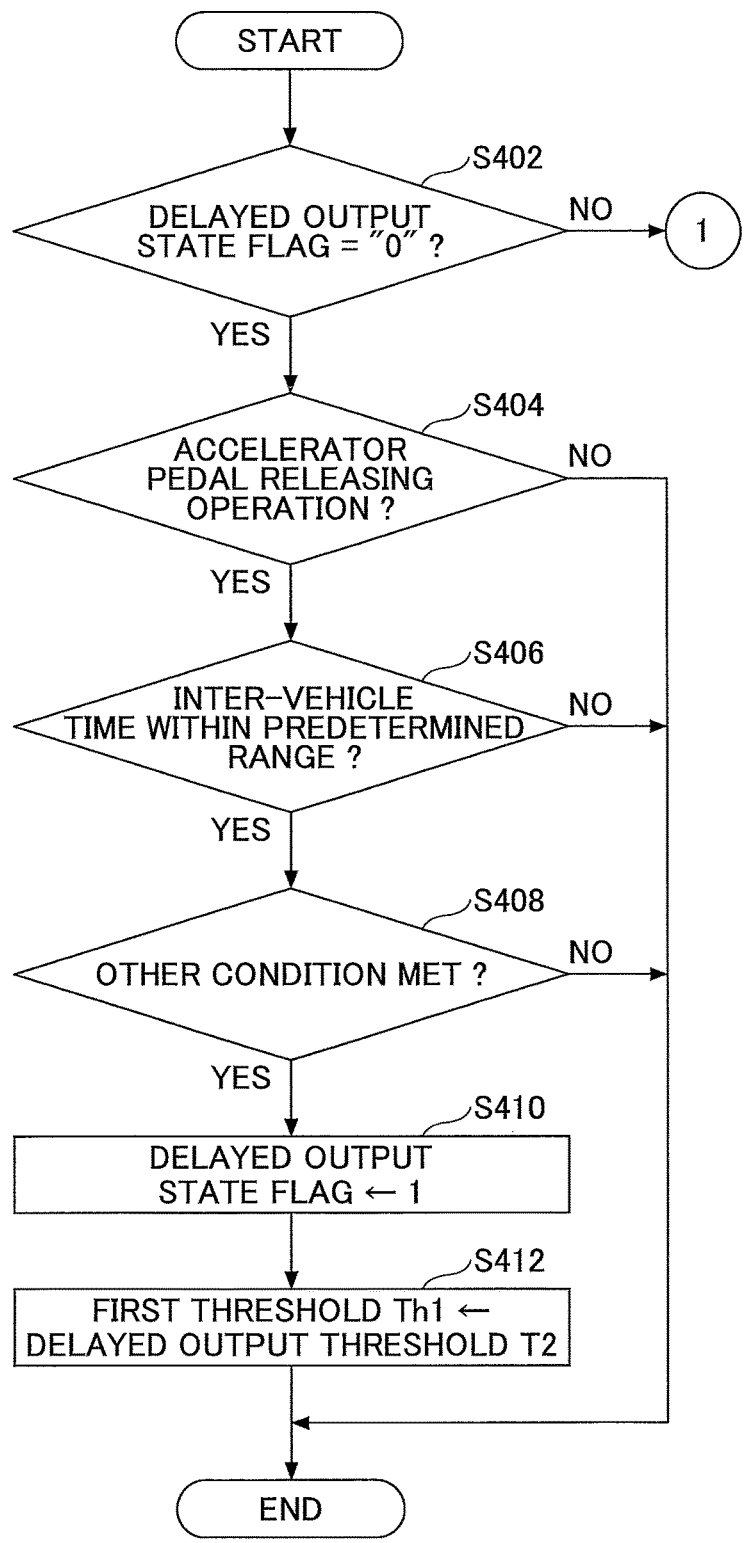

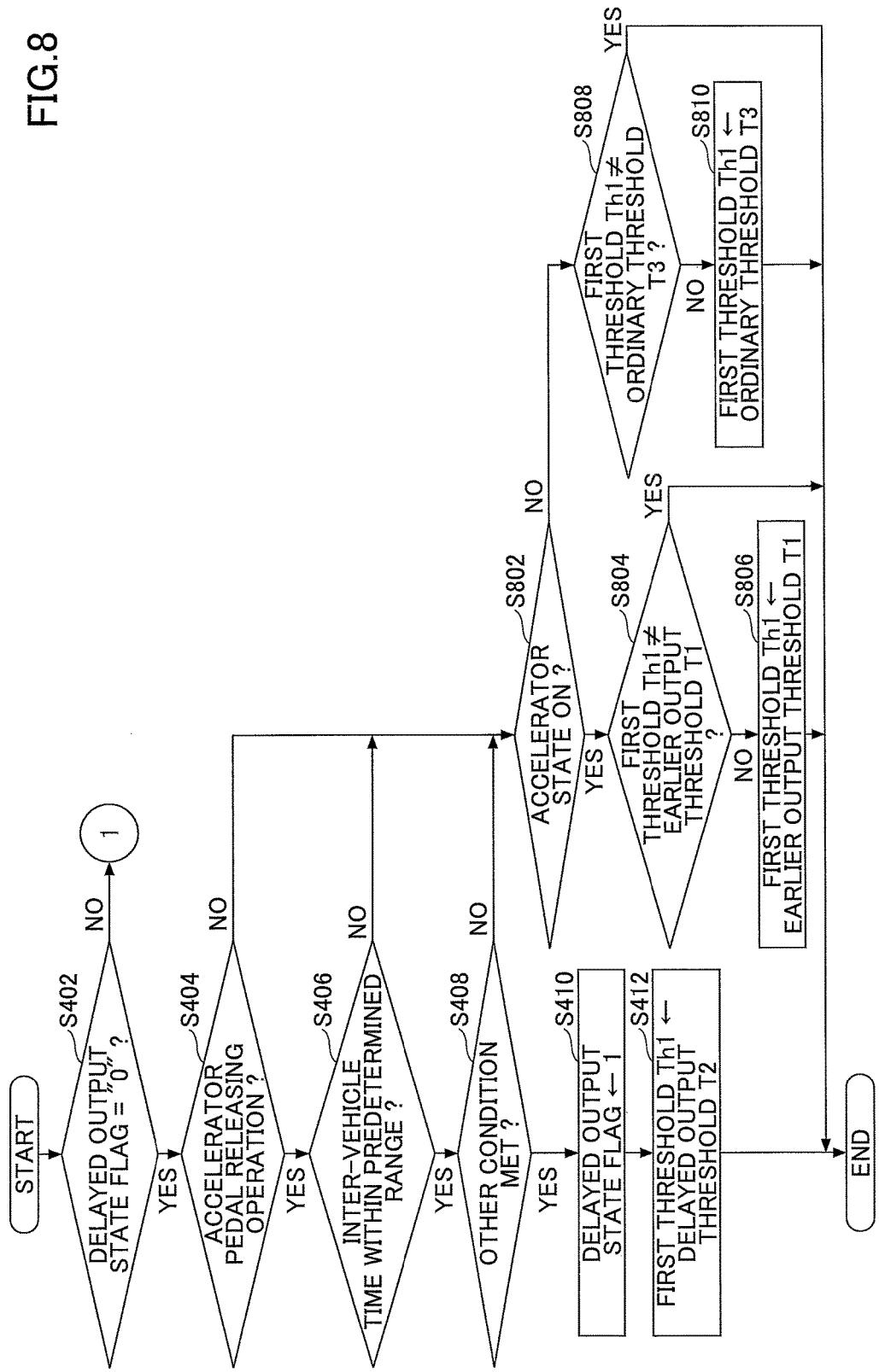

CONTROL APPARATUS FOR VEHICLE

CROSS REFERENCE TO RELATED APPLICATION

The present application is based on and claims the benefit of priority of Japanese Priority Application No. 2015-019477, filed on Feb. 3, 2015, the entire contents of which are hereby incorporated by reference.

FIELD

Preferred embodiments relate to a control apparatus used for a vehicle.

BACKGROUND

Japanese Patent Application Publication No. 2013-014225 (referred to as "Patent Document 1" hereinafter) discloses a vehicle collision alarm device that issues an alarm upon there being a probability of a collision between the host vehicle and a preceding vehicle. In the disclosed vehicle collision alarm device, an accelerator pedal operation causes a timing of issuing the alarm to be earlier.

A configuration disclosed in Patent Document 1 merely varies the timing of the alarm according to the presence or absence of the accelerator pedal operation, thus there is room left for an improvement in terms of reducing unnecessary alarm output events while outputting a necessary alarm earlier. For example, according to the configuration disclosed in Patent Document 1, when an accelerator pedal releasing operation is performed, the timing of the alarm is always delayed with respect to the timing before the accelerator pedal releasing operation event. The accelerator pedal releasing operation does not always involve a brake operation immediately after the accelerator pedal releasing operation, and there may be an accelerator pedal releasing operation that does not involve the brake operation immediately after the accelerator pedal releasing operation. Thus, it is not preferable to always delay timing of the alarm with respect to the accelerator pedal releasing operations performed in a variety of travel scenarios. This holds true not only for the alarm control but also for other controls that reduce the probability of the collision, such as an automatic brake control.

It is found that, when the accelerator pedal releasing operation is performed in a situation where a forward obstacle exists, the probability of the brake operation being performed immediately after the accelerator pedal releasing operation event can be determined with high accuracy based on a distance between the host vehicle and the forward obstacle at that time.

Therefore, an object of preferred embodiments is to provide a control apparatus for a vehicle, wherein the control apparatus can delay, when an accelerator pedal releasing operation is performed under a situation where a forward obstacle exists, a timing of executing a predetermined control that reduces a probability of the collision between the forward obstacle and a host vehicle based on a distance between the host vehicle and the forward obstacle at that time.

SUMMARY

According to one aspect, a control apparatus for vehicle includes a controller configured to:

(i) calculate, based on a distance and a relative speed between a host vehicle and a forward obstacle, a collision prediction time of a collision between the forward obstacle and the host vehicle;
(ii) execute a predetermined control when the collision prediction time is less than or equal to a predetermined threshold, the predetermined control reducing a probability of the collision between the forward obstacle and the host vehicle, and
(iii) decrease the predetermined threshold, when an accelerator pedal releasing operation is performed under a situation where the forward obstacle exists, depending on a first distance between the host vehicle and the forward obstacle at a time at which the accelerator pedal releasing operation is performed.

BRIEF DESCRIPTION OF DRAWINGS

FIG. 4 is a flowchart illustrating an example of a process (No. 1) executed by a threshold set part.

FIG. 8 is a flowchart illustrating another example of a process (No. 1) executed by the threshold set part.

DESCRIPTION OF EMBODIMENTS

In the following description, preferred embodiments will be described in detail by referring to the accompanying drawings.

Figure 1:
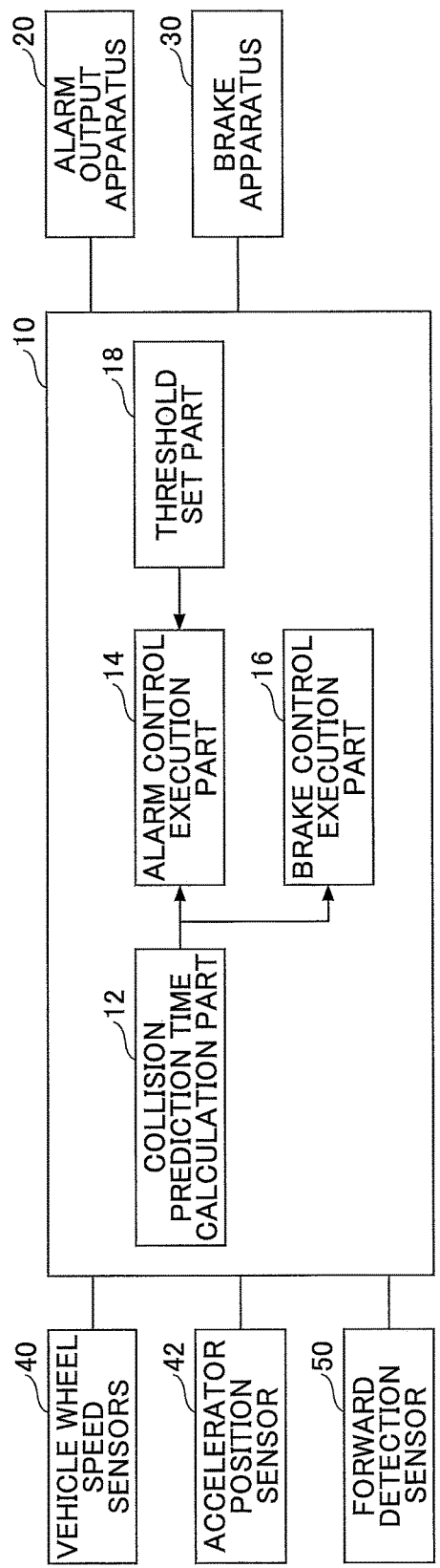
FIG. 1 is a diagram illustrating a vehicle system having a control apparatus for a vehicle according to a preferred embodiment.

FIG. 1 is a diagram illustrating a vehicle system 1 having a control apparatus for a vehicle according to one preferred embodiment. The vehicle system 1 includes a control apparatus (an example of a control apparatus used for a vehicle) 10, an alarm output apparatus 20, a brake apparatus 30, vehicle wheel speed sensors 40 and a forward detection sensor 50.

The control apparatus 10 is formed by a computer having a central processing unit (CPU) and memory. The control apparatus 10 is connected to the alarm output apparatus 20, the brake apparatus 30, the vehicle wheel speed sensors 40 and the forward detection sensor 50.

The alarm output apparatus 20 outputs the alarm with a sound and/or an image. The alarm output apparatus 20 includes a buzzer, a display, etc.

The brake apparatus 30 includes an ECU (Electronic Control Unit) (not illustrated) and an oil hydraulic circuit (not illustrated). The brake apparatus 30 generates a brake force according to an automatic braking demand from the control apparatus 10. The oil hydraulic circuit of the brake apparatus 30 is configured to be capable of performing automatic brake control. For example, the oil hydraulic circuit of the brake apparatus 30 includes a pump and an accumulator to generate high pressure oil. At the time of the automatic brake control, valves such as a master cylinder cut solenoid valve, a pump, etc. are controlled to increase wheel cylinder pressures of wheel cylinders. Further, the oil hydraulic circuit of the brake apparatus 30 may be equal to a configuration that is used for a brake by wire system such as an ECB (Electric Control Braking).

The vehicle wheel speed sensors 40 detect rotation speeds of the respective wheels. The vehicle wheel speed sensors 40 each are provided for the respective wheels, for example.

An accelerator position sensor 42 detects the accelerator position (pressed down amount of the accelerator pedal). The accelerator position sensor 42 outputs information representing a detection result of the accelerator position to the control apparatus 10.

The forward detection sensor 50 detects information representing a relationship between a forward obstacle and a host vehicle. For example, the forward detection sensor 50 detects a state of the forward obstacle in front of the host vehicle using an electric wave (millimeter wave, for example), a light wave (laser, for example) or an ultrasonic wave as a detection wave. The forward detection sensor 50 detects information which represents a relationship between the forward obstacle and the host vehicle such as a relative speed, a distance and a direction (a lateral position) with respect to the host vehicle, for example, at a predetermined cycle. The information that represents the relationship between the forward obstacle and the host vehicle is transmitted to the control apparatus 10 at a predetermined cycle. It is noted that any functions of the forward detection sensor 50 (a function of calculating the position of the forward obstacle, for example) may be implemented by the control apparatus 10.

An image sensor may be used in addition to or instead of the forward detection sensor 50. The image sensor includes a camera, which includes imaging elements such as CCDs (charge-coupled device), CMOSs (complementary metal oxide semiconductor), etc., and an image processor to recognize the state of the forward obstacle. The image sensor may be of a stereo type or include two or more cameras that are provided in different orientations. The image sensor detects, based on an image recognition result, the information which represents the relationship between the forward obstacle and the host vehicle such as a relative speed, and position information of the forward obstacle with respect to the host vehicle, for example, at a predetermined cycle. The position information of the forward obstacle includes information related to the position (distance) of the forward obstacle in the back-and-forth direction of the host vehicle, and information related to the lateral position of the forward obstacle in the lateral direction (width direction) of the host vehicle. The lateral position of the forward obstacle may be calculated based on a center position of a pixel group related to the forward obstacle in the lateral direction. Alternatively, the lateral position of the forward obstacle may be calculated as a range between a left end lateral position and a right end lateral position. The information (detection result) obtained by the image sensor may be transmitted to the control apparatus 10 at a predetermined frame cycle. It is noted that the image processing function of the image processor (a function of calculating a position of the forward obstacle, for example) may be implemented by the control apparatus 10.

The control apparatus 10 includes a collision prediction time calculation part 12, an alarm control execution part 14, a brake control execution part 16 and a threshold set part 18.

The collision prediction time calculation part 12 calculates a collision prediction time of a collision between the forward obstacle and the host vehicle based on the information (i.e., the distance and the relative speed between the forward obstacle and the host vehicle) obtained from the forward detection sensor 50. The collision prediction time is to a TTC (Time to Collision) that corresponds to a time remaining until the collision of the host vehicle with the forward obstacle. The TTC may be derived by dividing the distance from the host vehicle to the forward obstacle by the relative speed of the forward obstacle with respect to the host vehicle.

The alarm control execution part 14 controls the alarm output apparatus 20. The alarm control execution part 14 performs an alarm control (an example of a predetermined control) when the TTC is less than or equal to a first threshold Th1. The alarm control outputs the alarm via the alarm output apparatus 20. It is noted that, once the TTC becomes less than or equal to the first threshold Th1 and thus the alarm is output, the alarm may be output continuously for a predetermined time, regardless of the relationship between the TTC and the first threshold Th1 thereafter.

The brake control execution part 16 controls the brake apparatus 30. The brake control execution part 16 executes automatic brake control upon the TTC being less than or equal to a second threshold Th2. The second threshold Th2 may be the same as the first threshold Th1; however, preferably, the second threshold Th2 is smaller than the first threshold Th1. For example, the automatic brake control is a control that increases the wheel cylinder pressures of the wheel cylinders under a situation where an operation of a brake pedal (not illustrated) is not performed by the driver or an operated stroke of the brake pedal is smaller than a predetermined threshold. The brake control execution part 16 outputs an automatic brake control demand upon the TTC being less than or equal to the second threshold Th2. It is noted that the brake control execution part 16 may generate the automatic brake control demand such that the brake force gradually increases.

The threshold set part 18 decreases the first threshold Th1 based on a first distance when an accelerator pedal releasing operation is performed under a situation where the forward obstacle exists. The first distance is a distance between the host vehicle and the forward obstacle at that time (i.e., when the accelerator pedal releasing operation is performed). It is noted that the first distance is not necessarily the precise distance at the time of detecting the accelerator pedal releasing operation as long as it substantially represents the distance between the host vehicle and the forward obstacle at the occurrence of the accelerator pedal releasing operation event. For example, the first distance may be the distance immediately before or after the detection of the accelerator pedal releasing operation, depending on the way of detecting the accelerator pedal releasing operation. The threshold set part 18 is further described hereinafter.

Figure 2:
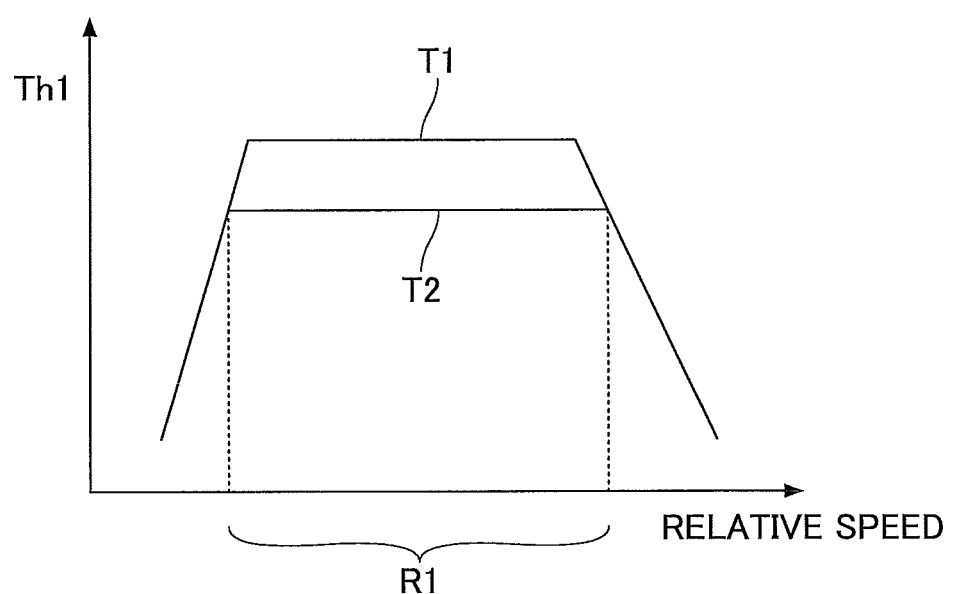
FIG. 2 is a diagram illustrating an example of an earlier output threshold T1 and a delayed output threshold T2.

FIG. 2 is a diagram illustrating an example of an earlier output threshold T1 and a delayed output threshold T2.

The earlier output threshold T1 is greater than the delayed output threshold T2. In the example illustrated in FIG. 2, the earlier output threshold T1 and the delayed output threshold T2 are varied according to the relative speed (between the host vehicle and the forward obstacle). However, the earlier output threshold T1 and the delayed output threshold T2 may be constant, regardless of the relative speed, or may be set only when the relative speed is within a predetermined relative speed range R1. Further, in the example illustrated in FIG. 2, the earlier output threshold T1 is greater than the delayed output threshold T2 only when the relative speed is within the predetermined relative speed range R1; however, the earlier output threshold T1 may be greater than the delayed output threshold T2 over a whole relative speed range.

Figure 3A:
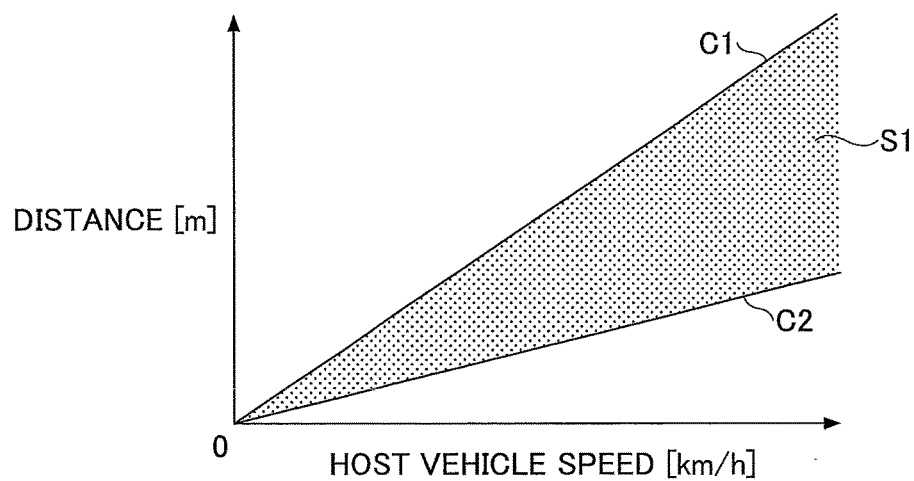
FIG. 3A is a diagram illustrating a relationship between the earlier output threshold T1 and the delayed output threshold T2.
Figure 3B:
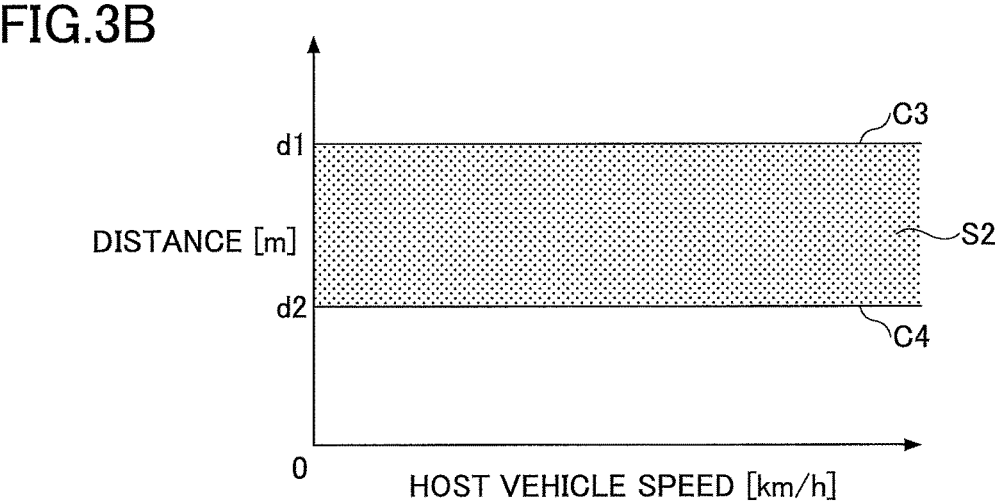
FIG. 3B is a diagram illustrating another relationship between the earlier output threshold T1 and the delayed output threshold T2.
Figure 3C:
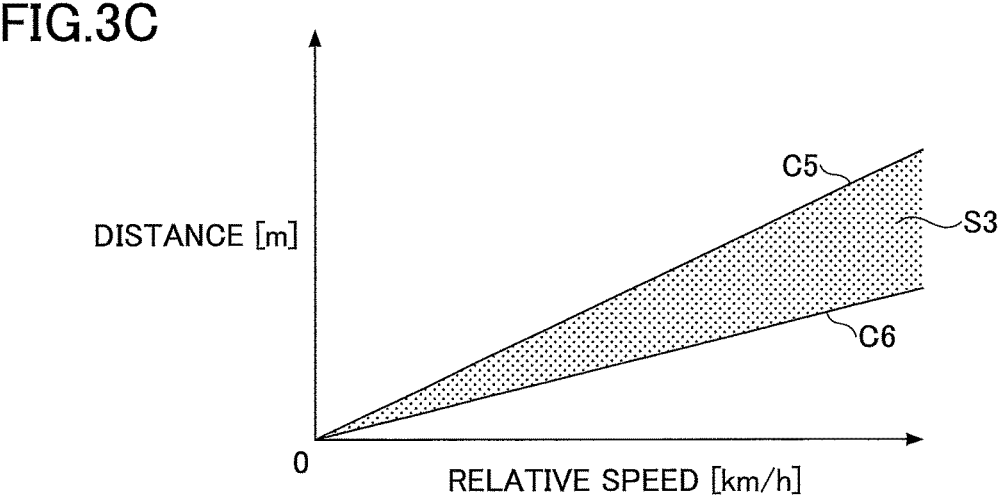
FIG. 3C is a diagram illustrating yet another relationship between the earlier output threshold T1 and the delayed output threshold T2.

Next, with reference to FIGS. 3A through 3C, a relationship between the first distance, the earlier output threshold T1 and the delayed output threshold T2 is explained.

FIG. 3A is a diagram illustrating a relationship between the earlier output threshold T1 and the delayed output threshold T2. FIG. 3B is a diagram illustrating another relationship between the earlier output threshold T1 and the delayed output threshold T2. FIG. 3C is a diagram illustrating yet another relationship between the earlier output threshold T1 and the delayed output threshold T2.

FIG. 3A illustrates a way (first way) of switching between the earlier output threshold T1 and the delayed output threshold T2 according to an arrival time based on the first distance.

The arrival time is predicted by calculating a time required for the host vehicle to arrive at the current position of the forward obstacle. The arrival time is an estimated time period that is taken if the host vehicle travels from the current position of the host vehicle to the current position of the forward obstacle. When the forward obstacle is a stationary object, the arrival time of the host vehicle at the current position of the forward obstacle can be derived by dividing the distance (i.e., the first distance) to the forward obstacle by the host vehicle speed at that time. In this case, the arrival time is substantially the same as the TTC. It is noted that the host vehicle speed can be calculated based on the vehicle wheel speed sensors 40. The host vehicle speed may be calculated based on the rotational speed of an output shaft of a transmission, instead of the vehicle wheel speed sensors 40. It is noted that a preceding vehicle is assumed as a forward obstacle, hereinafter. In this case, the arrival time is an inter-vehicle time. It is noted that the inter-vehicle time can be derived by dividing the distance to the preceding vehicle by the host vehicle speed at that time.

In FIG. 3A, a line C1 corresponds to the inter-vehicle time equal to k1, and a line C2 corresponds to the inter-vehicle time equal to k2 (smaller than k1).

In the case of the first way, the threshold set part 18 sets the first threshold Th1 to the delayed output threshold T2 when the inter-vehicle time at the time of performance of the accelerator pedal releasing operation is within a predetermined range S1 that has an upper limit value k1 thereof. Specifically, the threshold set part 18 sets the first threshold Th1 to the delayed output threshold T2 when the inter-vehicle time at the time of performance of the accelerator pedal releasing operation is greater than or equal to k2 (an example of a second predetermined time) and less than or equal to k1 (an example of a first predetermined time). On the other hand, the threshold set part 18 sets the first threshold Th1 to the earlier output threshold T1 when the inter-vehicle time at the time of performance of the accelerator pedal releasing operation is not within the predetermined range S1 (i.e., less than k2 or greater than k1). This is because the accelerator pedal releasing operation, which is detected under a situation where the inter-vehicle time is greater than or equal to k2 and less than or equal to k1, involves the brake operation immediately after the accelerator pedal releasing operation with high probability.

Therefore, according to the first way, the execution timing of the alarm control in the case where the accelerator pedal releasing operation is highly likely to be followed by the driver performing the brake operation immediately after the accelerator pedal releasing operation can be delayed compared to the case where the accelerator pedal releasing operation is unlikely to be followed by the driver performing the brake operation immediately after the accelerator pedal releasing operation. That is, the first way detects whether it is likely that the driver will perform the brake operation immediately after the accelerator pedal releasing operation, and if so, delays execution of the alarm control. In other words, when the inter-vehicle time is within the predetermined range S1 (greater than or equal to k2 and less than or equal to k1) and the accelerator pedal releasing operation is detected, the probability that the driver has an intention to decelerate the host vehicle (to escape the collision with the preceding vehicle) is high and thus the probability that the brake operation is performed thereafter is high. In such a situation, output of the alarm can be delayed. On the other hand, when the accelerator pedal releasing operation is detected under a situation where the inter-vehicle time is greater than k1, the probability that the driver has an intention to decelerate the host vehicle is not always high and thus the probability that the brake operation is performed thereafter is not always high. In such a situation, output of the alarm should not be delayed.

The inter-vehicle time k1 corresponds to an upper limit value of a range of the inter-vehicle time in which it can be estimated that the accelerator pedal releasing operation is performed with respect to the preceding vehicle. Further, the inter-vehicle time k2 corresponds to a lower limit value of a range of the inter-vehicle time in which the collision is escapable by the brake operation after the accelerator pedal releasing operation. The value of k2 may be varied according to the distance between the host vehicle and the preceding vehicle, because a time required for the driver to switch the pedal to be pressed down from the accelerator pedal to the brake pedal, a pressing down force, etc., can be varied according to the distance between the host vehicle and the preceding vehicle.

FIG. 3B illustrates a way (second way) of switching between the earlier output threshold T1 and the delayed output threshold T2 according to the first distance. The inter-vehicle distance with respect to the preceding vehicle has a characteristic that the driver can recognize, and thus the driver's intention to decelerate the host vehicle (to escape the collision with the preceding vehicle) can be determined with high accuracy based on the inter-vehicle distance (first distance) at the time of performance of the accelerator pedal releasing operation. The second way is based on these findings.

In FIG. 3B, a line C3 corresponds to the inter-vehicle distance equal to d1, and a line C4 corresponds to the inter-vehicle distance equal to d2 (smaller than d1). It is noted that d2 is greater than 0.

In the case of the second way, the threshold set part 18 sets the first threshold Th1 to the delayed output threshold T2 when the inter-vehicle distance to the preceding vehicle is within a predetermined range S2, which has an upper limit value d1 thereof, and the accelerator pedal releasing operation is detected. Specifically, the threshold set part 18 sets the first threshold Th1 to the delayed output threshold T2 when the first distance is greater than or equal to d2 (an example of a second predetermined distance) and less than or equal to d1 (an example of a first predetermined distance). On the other hand, the threshold set part 18 sets the first threshold Th1 to the earlier output threshold T1 when the first distance is not within the predetermined range S2 (i.e., less than d2 or greater than d1), the threshold set part 18 sets the first threshold Th1 to the earlier output threshold T1. This is because the accelerator pedal releasing operation, which is detected under a situation where the inter-vehicle distance is greater than or equal to d2 and less than or equal to d1, is highly likely to be followed by the driver performing the brake operation immediately after the accelerator pedal releasing operation. Therefore, according to the second way, as is the case with the first way, the execution timing of the alarm control in the case where the accelerator pedal releasing operation is highly likely to be followed by the driver performing the brake operation immediately after the accelerator pedal releasing operation can be delayed compared to the case where the accelerator pedal releasing operation is unlikely to be followed by the driver performing the brake operation immediately after the accelerator pedal releasing operation.

FIG. 3C illustrates a way (third way) of switching between the earlier output threshold T1 and the delayed output threshold T2 according to a first collision prediction time based on the first distance.

The first collision prediction time corresponds to the TTC at the time of performance of the accelerator pedal releasing operation. The first collision prediction time can be derived by dividing the first distance by the relative speed (with respect to the forward obstacle) at the time of performance of the accelerator pedal releasing operation.

In FIG. 3C, a line C5 corresponds to the TTC equal to $T_{TTC1}$, and a line C6 corresponds to the TTC equal to $T_{TTC2}$ (smaller than $T_{TTC1}$). It is noted that $T_{TTC2}$ is greater than the earlier output threshold T1.

In the case of the third way, the threshold set part 18 sets the first threshold Th1 to the delayed output threshold T2 when the TTC is within a predetermined range S3, which has an upper limit value $T_{TTC1}$ thereof, and the accelerator pedal releasing operation is detected. Specifically, the threshold set part 18 sets the first threshold Th1 to the delayed output threshold T2 when the first collision prediction time is greater than or equal to $T_{TTC2}$ (an example of a second predetermined collision prediction time) and less than or equal to $T_{TTC1}$ (an example of a first predetermined collision prediction time). On the other hand, the threshold set part 18 sets the first threshold Th1 to the earlier output threshold T1 when the first collision prediction time is not within the predetermined range S3 (i.e., less than $T_{TTC2}$ or greater than $T_{TTC1}$). This is because the accelerator pedal releasing operation, which is detected under a situation where the TTC is greater than or equal to $T_{TTC2}$ and less than or equal to $T_{TTC1}$, is highly likely to be followed by the driver performing the brake operation immediately after the accelerator pedal releasing operation. Therefore, according to the third way, as is the case with the first way, the execution timing of the alarm control in the case where the accelerator pedal releasing operation is highly likely to be followed by the driver performing the brake operation immediately after the accelerator pedal releasing operation can be delayed compared to the case where the accelerator pedal releasing operation is unlikely to be followed by the driver performing the brake operation immediately after the accelerator pedal releasing operation.

In the following, the implementation in which the inter-vehicle time is used is described as a representative example. However, in the following, if replacing "inter-vehicle time" with "inter-vehicle distance" or "TTC", the "predetermined range S1 (also k1 and k2)" with "predetermined range S2" or "predetermined range S3", etc., the applications in which the inter-vehicle distance or the TTC is used can be implemented.

Figure 5:
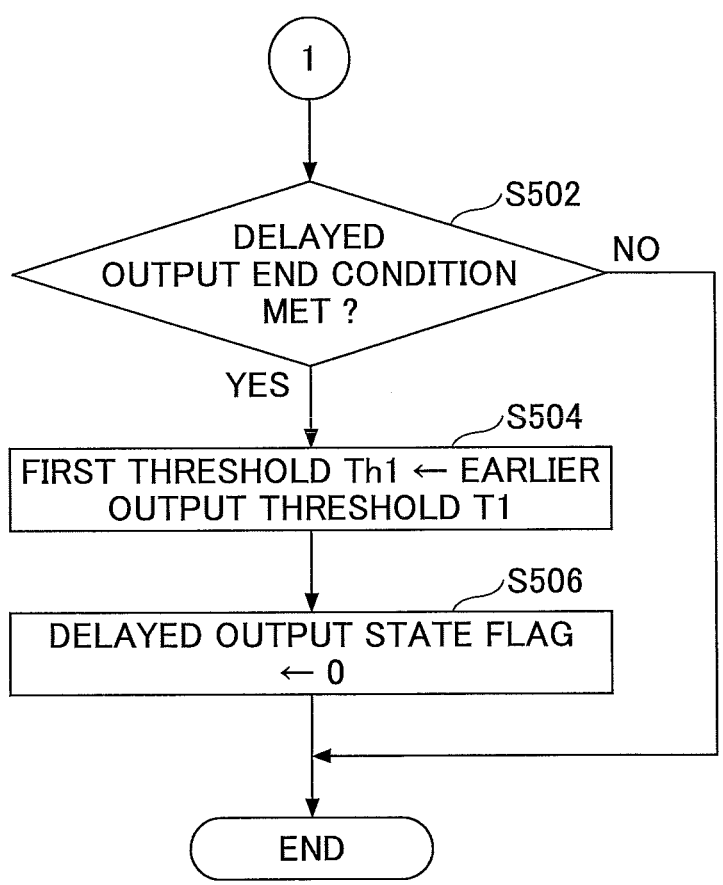
FIG. 5 is a flowchart illustrating an example of a process (No. 2) executed by the threshold set part.

Next, with reference to FIG. 4 and FIG. 5, examples of an operation of the control apparatus 10 are described.

FIG. 4 is a flowchart illustrating an example of a process (No. 1) executed by the threshold set part 18. The process illustrated in FIG. 4 is performed at a predetermined cycle. It is noted that, in the following explanation, it is assumed that values of respective flags can be "0" or "1".

In step S402, the threshold set part 18 determines whether a delayed output state flag is "0". An initial value of the delayed output state flag is "0". The delayed output state flag being "1" means that a delayed output condition has been met and a delayed output mode is being performed. If it is determined that the delayed output state flag is "0", the process routine goes to step S404, otherwise the process routine goes to step S502 in FIG. 5.

In step S404, the threshold set part 18 determines whether the accelerator pedal releasing operation is detected. For example, the threshold set part 18 may determine that the accelerator pedal releasing operation is detected upon the accelerator position being decreased from a position greater than a predetermined position to 0 based on the information from the accelerator position sensor 42. Another way of determining the same is described hereinafter. When the accelerator pedal releasing operation is detected, the process routine goes to step S406, otherwise the process routine at this cycle ends directly.

In step S406, the threshold set part 18 calculates the inter-vehicle time based on the latest information obtained from the forward detection sensor 50, etc., to determine whether the calculated inter-vehicle time is within the predetermined range S1. The predetermined range S1 is as described above. It is noted that, if no preceding vehicle is recognized, the inter-vehicle time is "null" and thus it is determined that the inter-vehicle time is not within the predetermined range S1. When it is determined that the inter-vehicle time is within the predetermined range S1, the process routine goes to step S408, otherwise the process routine at this cycle ends directly.

In step S408, the threshold set part 18 determines whether other conditions, which are required to be met in order for a delayed output start condition to be met, are met. Other conditions are met when all the following conditions (1) through (2) are met, for example.

(1) the host vehicle speed is less than a predetermined speed V1 and a preceding vehicle speed is less than a predetermined speed V2.

(2) the lateral position of the preceding vehicle is less than a predetermined distance D1.

It is noted that the condition (1) is adapted such that it is met when the preceding vehicle is in the decelerated state. The predetermined speeds V1 and V2 may be the same; however, the predetermined speed V1 may be greater than the predetermined speed V2. The condition (2) is adapted such that it is met when a traveling lane of the preceding vehicle is the same as that of the host vehicle. The lateral position of the preceding vehicle can be determined based on the information from the forward detection sensor 50. It is noted that, in the case of the vehicle that has a preceding vehicle following control function of following the preceding vehicle; such as ACC (Adaptive Cruise Control) or an ordinary cruise control, another condition to be met can be that the preceding vehicle following control function is in an OFF state. This additional condition may be added as an "AND" condition to other conditions mentioned above. If it is determined that the other conditions, which are required to be met in order for a delayed output start condition to be met, are met, the process routine goes to step S410, otherwise the process routine at this cycle ends.

In step S410, the threshold set part 18 sets the delayed output state flag to "1".

In step S412, the threshold set part 18 sets the first threshold Th1 to the delayed output threshold T2. It is noted that an initial value of the first threshold Th1 is the earlier output threshold T1.

According to the process illustrated in FIG. 4, the threshold set part 18 sets the first threshold Th1 to the delayed output threshold T2 when the inter-vehicle time between the preceding vehicle and the host vehicle is within the predetermined range S1 and the accelerator pedal releasing operation is detected. On the other hand, the threshold set part 18 sets (keeps) the first threshold Th1 to the earlier output threshold T1 even when the accelerator pedal releasing operation is detected if the inter-vehicle time between the preceding vehicle and the host vehicle is not within the predetermined range S1. As a result of this, it becomes possible to increase a probability that a necessary alarm is output earlier while a frequency of an unnecessary alarm is reduced.

It is noted that, in the process illustrated in FIG. 4, the order of determinations in step S404 through step S408 is arbitrary. For example, the determination of step S406 may be performed prior to the determination of step S404.

FIG. 5 is a flowchart illustrating an example of a process (No. 2) executed by the threshold set part 18.

In step S502, the threshold set part 18 determines whether a delayed output end condition is met. The delayed output end condition is met when one of the following conditions (11) through (14) is met, for example.
  (11) the host vehicle speed is greater than or equal to the predetermined speed V1 and the preceding vehicle speed is greater than or equal to the predetermined speed V2.
  (12) the accelerator position is greater than or equal to a predetermined position Acc1.
  (13) the lateral position of the preceding vehicle is a predetermined distance D1 and a new preceding vehicle flag is "1".
  (14) a state in which the accelerator position is 0 continues for a predetermined time.

It is noted that the condition (11) is adapted such that it is met when the preceding vehicle is not in the decelerated state. The condition (12) means that the driver no longer has the intention to decelerate the host vehicle. The condition (13) means that a condition, which is required to be met in order to change the target of the preceding vehicle to be monitored, is met. The new preceding vehicle flag is set to "1" when a new target of the preceding vehicle to be monitored is detected. The condition (14) is used as a guard condition at the time of an aimless driving. It is noted that, in the case of the vehicle that has the preceding vehicle following control function (e.g., ACC), another condition to be met can be that the preceding vehicle following control function is in an ON state. This additional condition may be added as an "OR" condition to the other conditions mentioned above.

In step S504, the threshold set part 18 resets the first threshold Th1 to the earlier output threshold T1.

In step S506, the threshold set part 18 resets the delayed output state flag to "0".

According to the process illustrated in FIG. 5, the threshold set part 18 returns the first threshold Th1 from the delayed output threshold T2 to the earlier output threshold T1 upon the delayed output end condition being met. As a result of this, it becomes possible to suppress an unnecessary continuation of a state in which the first threshold Th1 is set to the delayed output threshold T2, and thus the system can transition to a state in which a necessary alarm can be output earlier.

Figure 6:
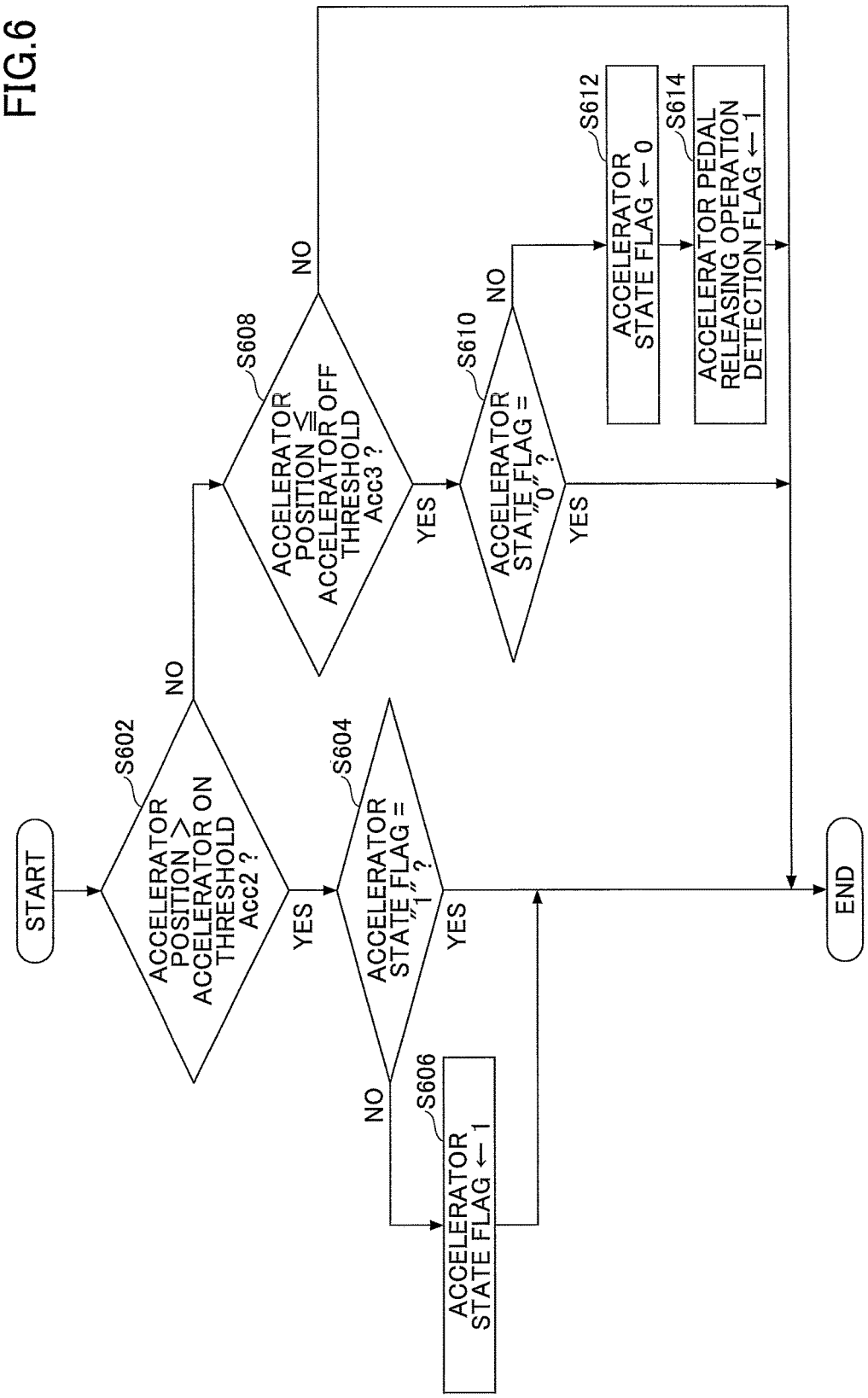
FIG. 6 is a flowchart illustrating an example of a way of detecting an accelerator pedal releasing operation.

Next, with reference to FIG. 6 and FIG. 7, a preferable example of a way of detecting the accelerator pedal releasing operation is described.

FIG. 6 is a flowchart illustrating an example of a way of detecting the accelerator pedal releasing operation. The process illustrated in FIG. 6 may be performed as the process of step S404 in FIG. 4.

In step S602, the threshold set part 18 determines whether the accelerator position is greater than a predetermined ON threshold (referred to as "accelerator ON threshold" hereinafter) Acc2 based on the latest information from the accelerator position sensor 42. The accelerator ON threshold Acc2 is greater than 0, and is adapted to detect a start of the accelerator pedal operation of the driver. If it is determined that the accelerator position is greater than accelerator ON threshold Acc2, the process goes to step S604, and otherwise the process goes to step S608.

In step S604, the threshold set part 18 determines whether an accelerator state flag is "1". The accelerator state flag being "1" represents that the accelerator state is in its ON state. If it is determined that the accelerator state flag is "1", the process routine ends directly, otherwise (i.e., accelerator state flag is "0") the process routine goes to step S606.

In step S606, the threshold set part 18 sets the accelerator state flag to "1".

In step S608, the threshold set part 18 determines whether the accelerator position is less than or equal to a predetermined OFF threshold (referred to as "accelerator OFF threshold" hereinafter) Acc3. The accelerator OFF threshold Acc3 is less than the accelerator ON threshold Acc2. If it is determined that the accelerator position is less than or equal to the accelerator OFF threshold Acc3, the process routine goes to step S610, otherwise the process routine ends directly.

In step S610, the threshold set part 18 determines whether the accelerator state flag is "0". If it is determined that the accelerator state flag is "0", the process routine ends directly, otherwise (i.e., accelerator state flag is "1") the process routine goes to step S612.

In step S612, the threshold set part 18 resets the accelerator state flag to "0".

In step S614, the threshold set part 18 sets an accelerator pedal releasing operation detection flag to "1". An initial value of the accelerator pedal releasing operation detection flag is "0". The accelerator pedal releasing operation detection flag being "1" means that the accelerator pedal releasing operation has been detected. Thus, if the accelerator pedal releasing operation detection flag is "1", the determination result of step S404 is "YES". It is noted that the threshold set part 18 may reset the accelerator pedal releasing operation detection flag to "0" after a lapse of a predetermined time.

According to the process illustrated in FIG. 6, the threshold set part 18 sets the accelerator pedal releasing operation detection flag to "1" when the accelerator state flag is changed from "1" to "0".

Figure 7A:
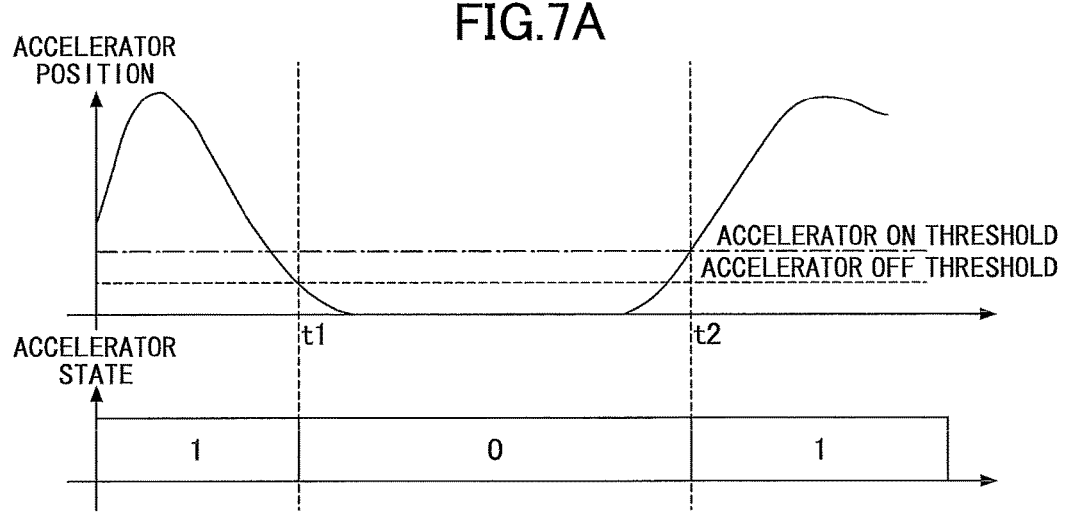
FIG. 7A is a diagram explaining a process illustrated in FIG. 6.
Figure 7B:
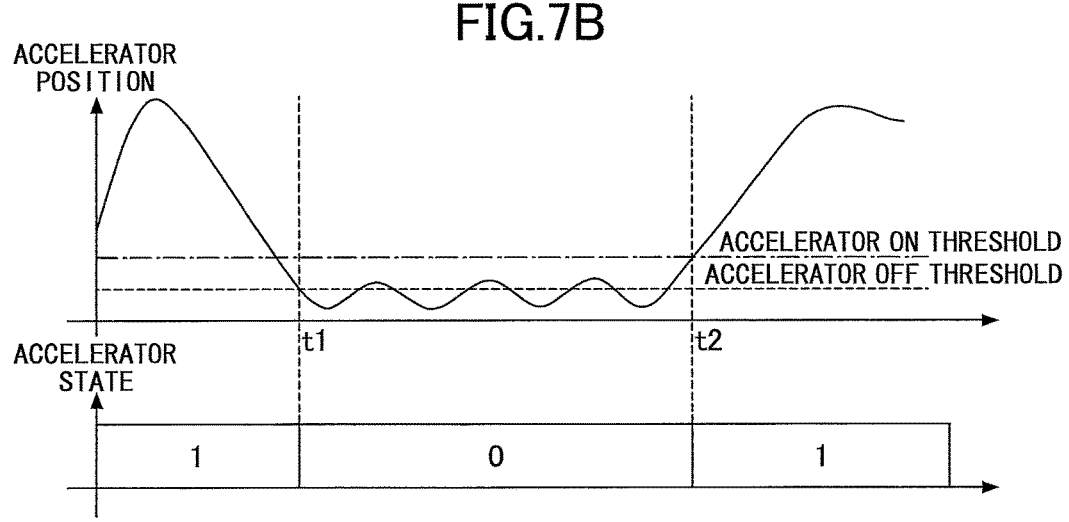
FIG. 7B is a diagram explaining a process illustrated in FIG. 6.
Figure 7C:
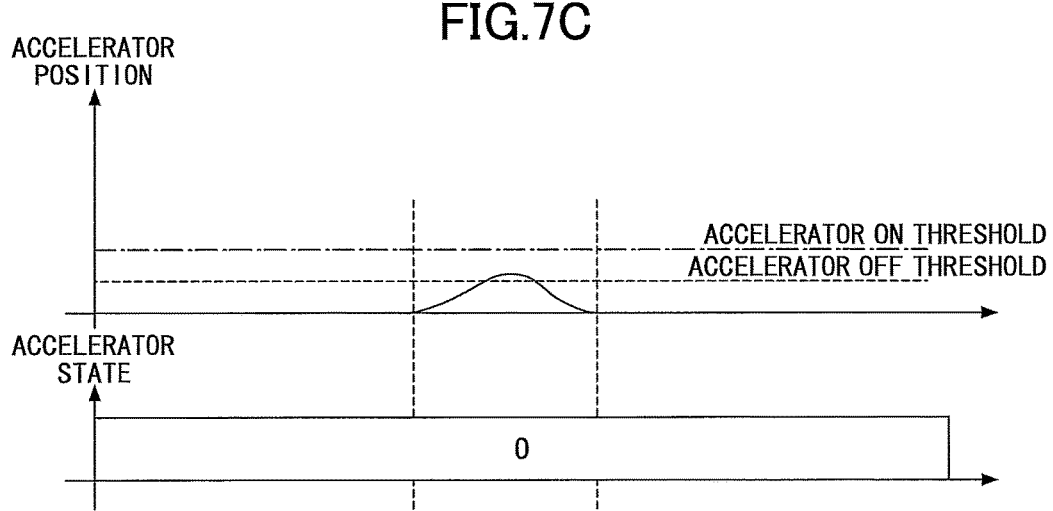
FIG. 7C is a diagram explaining a process illustrated in FIG. 6.

FIGS. 7A through 7C are diagrams explaining the process illustrated in FIG. 6. FIGS. 7A through 7C each illustrate different accelerator pedal operations. In FIGS. 7A through 7C, a relationship between the accelerator position, the accelerator ON threshold Acc2 and the accelerator OFF threshold Acc3 is illustrated in time series on the upper side, and the state of the accelerator state flag is illustrated in time series on the lower side.

FIG. 7A illustrates the time series of the accelerator position when the driver completely releases the accelerator pedal to follow the preceding vehicle. In this case, the accelerator state flag changes from "1" to "0" at time t1, which causes the accelerator pedal releasing operation to be detected. It is noted that, in the example illustrated in FIG. 7A, at time t2, the accelerator pedal operation of the driver causes the accelerator position to exceed the accelerator ON threshold Acc2, which causes the accelerator state flag to change from "0" to "1".

FIG. 7B illustrates the time series of the accelerator position when the driver incompletely (partially) releases the accelerator pedal to follow the preceding vehicle. In this case, the accelerator state flag changes from "1" to "0" at time t1, which causes the accelerator pedal releasing operation to be detected. At time t2, the accelerator pedal operation of the driver causes the accelerator position to exceed the accelerator ON threshold Acc2, which causes the accelerator state flag to change from "0" to "1". During a period from time t1 to time t2, the accelerator pedal operation of the driver causes the accelerator position to exceed the accelerator OFF threshold Acc3 but not exceed the accelerator ON threshold Acc2, which causes the accelerator state flag to continuously be "1". Thus, it becomes possible to suppress the hunting (changes with a short interval) of the accelerator state flag between "0" and "1" under a situation where a subtle change in the accelerator position, which does not reflect the acceleration intention or the deceleration intention of the driver, is detected. As a result of this, the detection of the accelerator pedal releasing operation due to such a hunting can be suppressed.

In FIG. 7C illustrates the time series of the accelerator position when the driver has no intention to accelerate the host vehicle. In this case, the accelerator position does not exceed the accelerator ON threshold Acc2, which causes the accelerator state flag to continuously be "0". Thus, the change of the accelerator state flag from "0" to "1" and the change of the accelerator state flag from "1" to "0" thereafter are suppressed under a situation where the subtle increase in the accelerator position, which could occur even when the driver has no intention to accelerate the host vehicle, is detected. As a result of this, the detection of the accelerator pedal releasing operation due to such a change in the accelerator position can be suppressed.

In this way, according to the process illustrated in FIG. 6, by setting separately the accelerator ON threshold Acc2 and the accelerator OFF threshold Acc3 (i.e., the accelerator ON threshold Acc2 and the accelerator OFF threshold Acc3 are different), the accelerator pedal releasing operation that reflects the deceleration intention of the driver can be detected with high accuracy. As a result of this, it becomes possible to further increase a probability that a necessary alarm is output earlier while a frequency of an unnecessary alarm is reduced.

Next, with reference to FIG. 8, another example of an operation of the control apparatus 10 is described.

FIG. 8 is a flowchart illustrating another example of a process (No. 1) executed by the threshold set part 18. The process illustrated in FIG. 8 is performed at a predetermined cycle. The process illustrated in FIG. 8 is performed instead of the process illustrated in FIG. 4 and described above.

The process illustrated in FIG. 8 differs from the process illustrated in FIG. 4 and described above in that processes of step S802 through step S810 are added.

In step S802, the threshold set part 18 determines whether the accelerator state is in its ON state. For example, the threshold set part 18 may determine that the accelerator state is in its ON state when the accelerator position is greater than the accelerator ON threshold Acc2 (see the explanation related to FIG. 6). If it is determined that the accelerator state is in its ON state, the process routine goes to step S804, otherwise the process routine goes to step S808.

In step S804, the threshold set part 18 determines whether the current first threshold Th1 is not the earlier output threshold T1. If it is determined that the current first threshold Th1 is not the earlier output threshold T1, the process routine goes to step S806, otherwise (it is determined that the current first threshold Th1 is the earlier output threshold T1) the process routine ends directly.

In step S806, the threshold set part 18 resets the first threshold Th1 to the earlier output threshold T1.

In step S808, the threshold set part 18 determines whether the current first threshold Th1 is not an ordinary threshold T3. If it is determined that the current first threshold Th1 is not the ordinary threshold T3, the process routine goes to step S810, otherwise (it is determined that the current first threshold Th1 is the ordinary threshold T3) the process routine ends directly.

In step S810, the threshold set part 18 sets the first threshold Th1 to the ordinary threshold T3. The ordinary threshold T3 is less than the earlier output threshold T1 and greater than the delayed output threshold T2.

According to the predetermined illustrated in FIG. 8, the threshold set part 18 sets the first threshold Th1 to the delayed output threshold T2 when the inter-vehicle time between the preceding vehicle and the host vehicle is within the predetermined range S1 and the accelerator pedal releasing operation is detected. On the other hand, the threshold set part 18 sets the first threshold Th1 to the earlier output threshold T1 or the ordinary threshold T3 according to the accelerator state when the inter-vehicle time between the preceding vehicle and the host vehicle is not within the predetermined range S1. In other word, if the accelerator state is in its ON state, the first threshold Th1 is set to the earlier output threshold T1, otherwise the first threshold Th1 is set to the ordinary threshold T3. As a result of this, if the accelerator state is in its ON state, a probability that the alarm is output earlier becomes higher with respect to the case where the accelerator state is not in its ON state. As a result of this, it becomes possible to increase a probability that a necessary alarm is output earlier while a frequency of an unnecessary alarm is reduced.

In the example illustrated in FIG. 8, the first threshold Th1 is switched between the three values (i.e., T1 through T3); however, the first threshold Th1 may be switched between four or more values, or may be switched in another manner. For example, a threshold T4 (less than T2) for a brake operation may be prepared. In this case, the threshold set part 18 may set the first threshold Th1 to the threshold T4 when the brake operation is detected.

The present invention is disclosed with reference to preferred embodiments. However, it should be understood that the present invention is not limited to the above-described embodiments, and variations and modifications may be made without departing from the scope of the present invention.

For example, according to the embodiments, the threshold set part 18 sets the first threshold Th1 to the earlier output threshold T1 when the inter-vehicle time is less than the lower limit value k2 and the accelerator pedal releasing operation is detected. This is because, when the inter-vehicle time is small enough to be less than the lower limit value k2, the probability that the alarm is useful becomes high, regardless of whether the driver has the deceleration intention. However, the threshold set part 18 sets the first threshold Th1 to the delayed output threshold T2 when the inter-vehicle time is less than the lower limit value k2 and the accelerator pedal releasing operation is detected.

Further, according to the embodiments, with respect to the second threshold Th2, unlike the first threshold Th1, the threshold set part 18 does not vary the second threshold Th2 based on the inter-vehicle time, etc.; however, the threshold set part 18 may vary the delayed output threshold T2 as well. In other words, the feature described above and related to the alarm control can be applied to the automatic brake control (another example of a predetermined control). Specifically, the threshold set part 18 sets the second threshold Th2 to the delayed output threshold T4 when the inter-vehicle time is within the predetermined range S1 (greater than or equal to k2 and less than or equal to k1) and the accelerator pedal releasing operation is detected. On the other hand, the threshold set part sets the second threshold Th2 to the earlier output threshold T3 (greater than T4) when the inter-vehicle time is not within the predetermined range S1 (i.e., less than k2 or greater than k1) or the accelerator pedal releasing operation is not detected. It is noted that the second threshold Th2 (T3, T4) set in a certain situation may be smaller than the first threshold Th1 (T1, T2) set in the same situation.

Further, according to the embodiments, the vehicle system 1 includes the brake control execution part 16; however, the brake control execution part 16 may be omitted.

Further, in the example illustrated in FIG. 8, when the determination result of step S802 is "NO", the process routine goes to step S808, determining that the accelerator state is not in its ON state; however, this is not indispensable.

For example, the threshold set part 18 may determine in step S802 whether the accelerator position is greater than the accelerator ON threshold Acc2, and if the determination result is "NO", the threshold set part 18 may determine whether the accelerator position is less than the accelerator OFF threshold Acc3, instead of executing the process of step S808. In this case, if it is determined that the accelerator position is less than or equal to the accelerator OFF threshold Acc3, the process routine goes to step S808, otherwise the process routine ends directly.

What is claimed is:

1. A controller for a vehicle, the controller performing, upon there being a probability of a collision between a forward obstacle and a host vehicle, a predetermined control that reduces the probability of the collision, wherein
the controller delays a timing of executing the predetermined control such that the timing is delayed under a situation in which an accelerator pedal releasing operation is performed while a parameter is within a range compared to when the parameter is not within the range, the range having an upper limit value thereof, the parameter being
(1) a distance between the host vehicle and a current position of the forward obstacle;
(2) a first time corresponding to the distance between the host vehicle and the forward obstacle divided by a current host vehicle speed; or
(3) a second time corresponding to the distance between the host vehicle and the forward obstacle divided by a current relative speed between the host vehicle and the forward obstacle.

2. The controller of claim 1, wherein the predetermined control includes sounding of an alarm.

3. The controller of claim 1, wherein the predetermined control includes actuating brakes of the vehicle.

* * * * *